Oct. 7, 1969
H. E. CROZIER
3,471,264
AUTOMATIC GAS DETECTOR
Filed Sept. 7, 1965
2 Sheets-Sheet 1
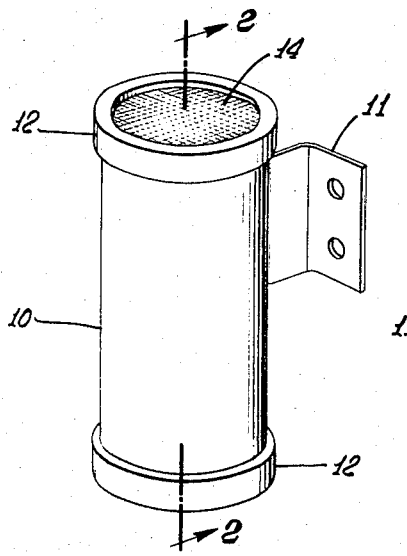
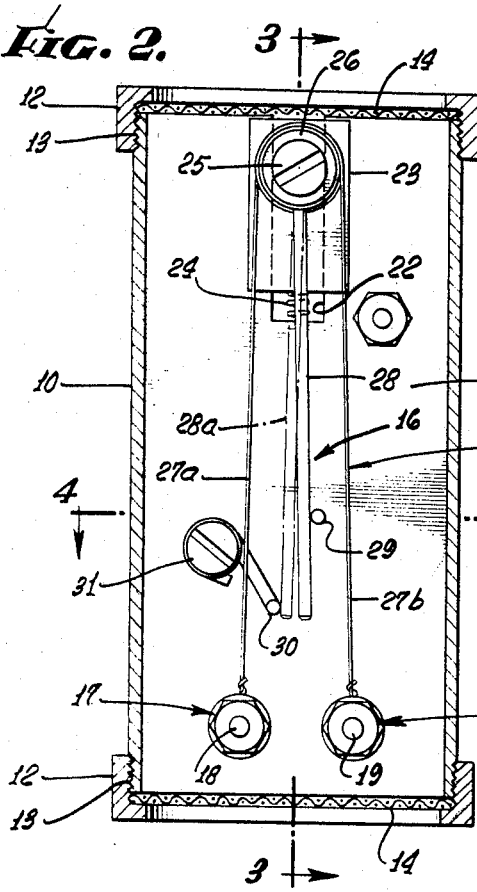
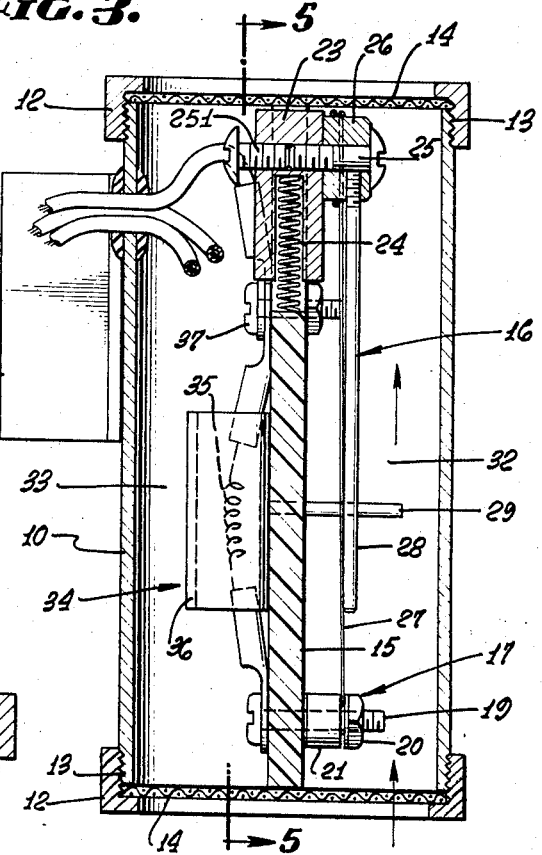
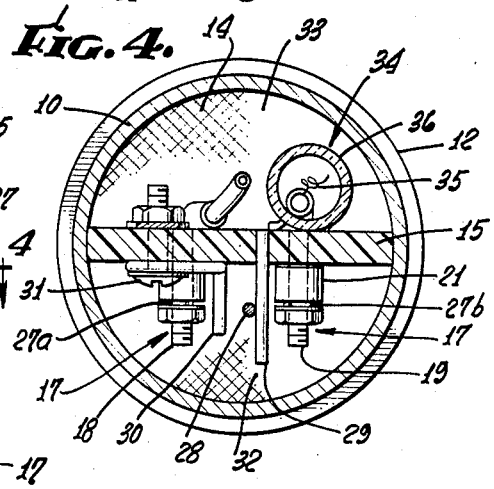
INVENTOR.
HAROLD E. CROZIER.
BY White & Haefliger
ATTORNEYS.

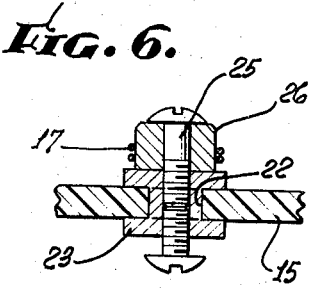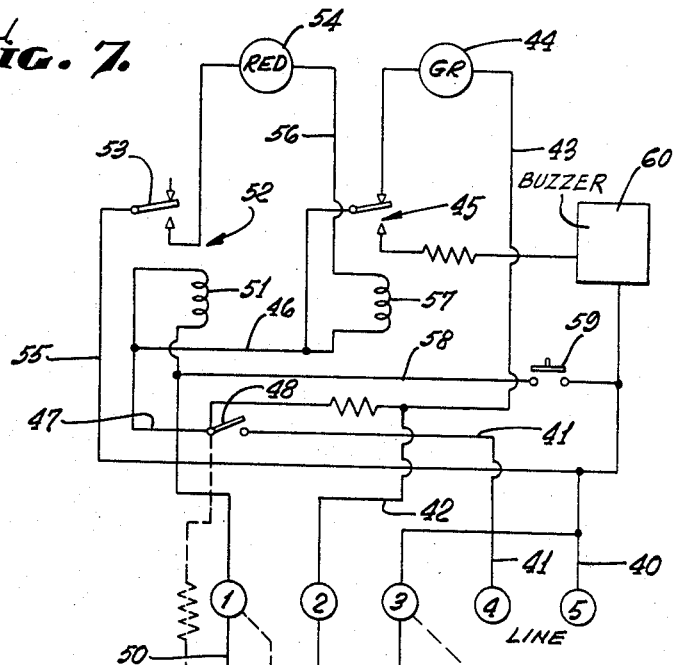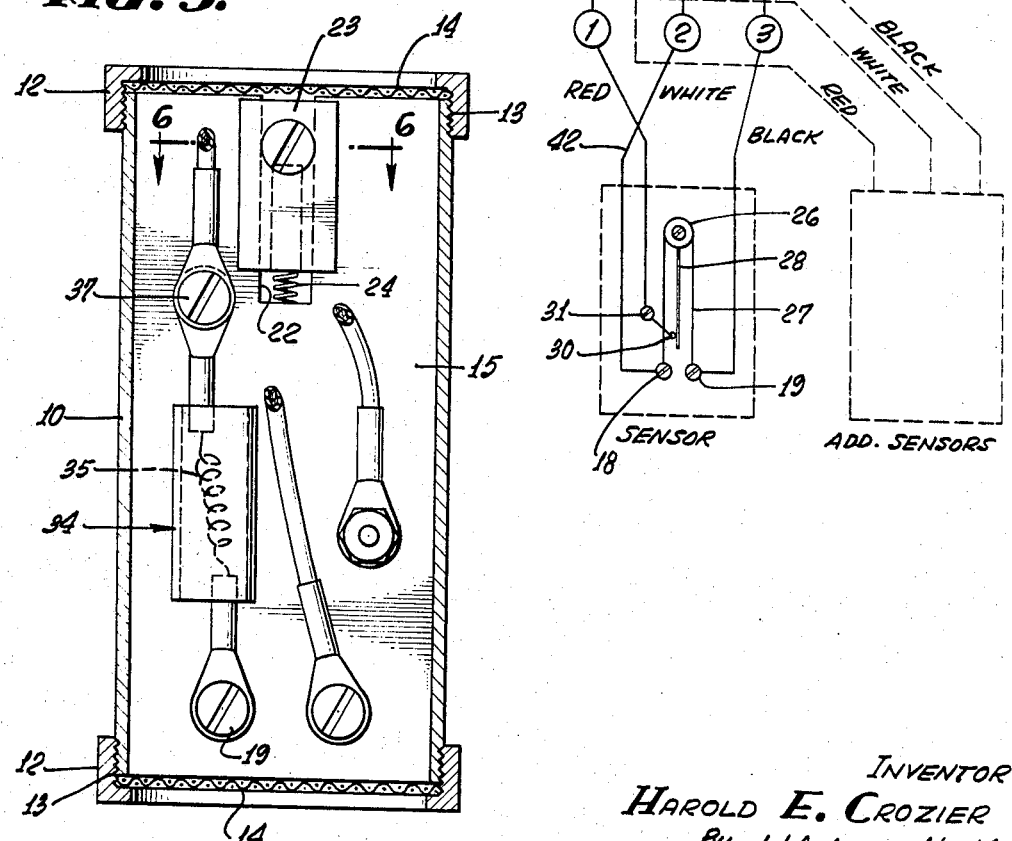

United States Patent Office 3,471,264
Patented Oct. 7, 1969

3,471,264
AUTOMATIC GAS DETECTOR
Harold E. Crozier, 11902 S. Birch,
Hawthorne, Calif. 90250
Filed Sept. 7, 1965, Ser. No. 485,152
Int. Cl. G01n 33/00; H01h 35/24
U.S. Cl. 23—255                                    8 Claims

ABSTRACT OF THE DISCLOSURE

Improvements in combustible gas detection devices of the type employing a wire element having differentially responsive extents, the wire according to this invention being passed about a rotatable and bodily movable drum which is spring-urged to tension said wire extents. Provided also is heating means for compensating temperature increases of the sensing wire.

---

This invention has to do with improvements in devices for detecting low concentrations of hydrocarbon and other combustible gases or vapors in various atmospheres, as for example within marine engine compartments and the like, and for signaling the presence of such gases or vapors before they reach combustible concentrations.

The invention has for its general object to provide for great sensitivity in the detection of low quantities of the combustible, hereinafter referred to as the gas, well below explosive concentrations in air, thus to assure effectively against explosions and fires.

Also generally contemplated are structural characteristics of the device which assure exposure of its sensing means to constant circulation of the atmosphere within which the device is placed.

The invention has in common with prior gas detecting devices the use of a sensing element or means employing an exposed finely divided metal of the platinum or heavy metal group, which when maintained in heated condition supports or causes oxidation of the contacting gas and thereby so increases the temperature of the element in relation to a connected component of the device as to be productive of signaling movement. Examples in the prior art of known uses of the platinum or heavy metals as catalysts for gas detection purposes, are Patents 2,645,564 and 2,816,863.

The present invention is concerned in one of its major aspects, with novel utilization of differential expansion of electrically heated catalytic and non-catalytic wire or wire-like extents, to sense very small differentials in elongations of such extents, resulting from correspondingly low gas concentrations in the atmosphere of the device.

In accordance with the invention, I employ a wire element extending from terminal electrical connections about a rotatable element, essentially a drum, the terminals and drum being relatively displaceable to tension the wire extents between them, and to constantly condition the heated wire so as to produce rotation of the device in response to differential elongation of the wire extents, one of which carries the catalyst. Suitable means, such as an extended arm swung by the drum, is provided to so cooperate with a signaling system that an alarm will be actuated in response to slight rotation of the drum, thus giving the device its extreme sensitivity.

Independently of specific details of the sensing means, the invention contemplates the further feature and object of accommodating operative gas sensing means within a body or housing so that there is maintained a constant convection flow of air through the housing and in contact with the sensing element so that the device continuously samples the atmosphere and thus is conditioned for instant response to significant gas concentrations.

The invention has various additional features and objects, all of which as well as those indicated in the foregoing will be fully understood from the following description of an illustrative embodiment of the invention shown by the accompanying drawing, in which:

FIG. 1 is a view showing the detector device in perspective elevation;
FIG. 2 is an enlarged cross section on line 2—2 of FIG. 1;
FIG. 3 is a cross section taken on line 3—3 of FIG. 2;
FIG. 4 is a transverse section on line 4—4 of FIG. 2;
FIG. 5 is a section taken on line 5—5 of FIG. 3;
FIG. 6 is a cross section on line 6—6 of FIG. 5; and
FIG. 7 is a wiring diagram illustrative of a signaling system useable in conjunction with the detector device.

Referring to the drawings, the device is shown to comprise a tubular body or housing 10 adapted to be mounted in vertical position as by bracket 11 within a space or compartment whose atmosphere is to be sensed for combustible gas. The housing has removable top and bottom air-passing closures in the form of rings 12 threaded at 13 to the housing and confining screen discs 14.

The housing contains a non-conductive support such as an essentially flat plate 15 which is shown to be positioned diametrically or centrally within the housing and normally is removably retained therein by frictional engagement against the housing side wall. Plate 15 mounts at one side thereof a gas sensing instrument generally indicated at 16 and shown in FIG. 2 to comprise a pair of fixed electrical terminals 17 comprising screws 18 and 19 extending through the support 15 and held thereto by nuts 20 tightened toward spacers 21. The top extent of the support 15 is centrally slotted at 22 to accommodate a side edge slotted cross head or slide 23, see FIG. 6, which has slight vertical shiftability against the resistance of coil spring 24. Referring to FIG. 3, slide 23 carries a screw shaft 25 which mounts a circular rotatable conductive element 26 functioning as a drum and about which is looped one or more complete turns of a wire 27 terminally connected to the electrical terminal 17 and extending continuously about the drum 26. The screw 251 is adjustable and engageable with screw 25 to hold the latter in any axial position that will allow free rotation of the drum but without excessive looseness of the latter. As will appear, in the operating condition of the device, wire 27 is electrically heated, and its respective extents 27a and 27b undergo differential elongation in the presence of gas to be sensed. These wire extents 27a and 27b may be run substantially parallel or at angular departures from parallel, and typically the wire may be of 0.010 inch diameter Nichrome. Normally the effect of spring 24 is to exert against the slide 23 and cross head 24 an upward thrust which uniformly tensions the wire extents.

One of these extents, e.g., 27a, is in effect given catalytic properties by bonding thereto and throughout a length of say two inches according to the drawing scale, a coating which presents finely divided and uniformly distributed exposed particles of a metal having the property of promoting oxidation and invisible combustion of small gas concentrations in the atmosphere within which the device is installed. As previously indicated, such coatings employ for example finely divided platinum or a heavy metal group or platinum group metal, and may be constituted and applied in the manner known to those familiar with this art.

Suitable means is provided for effecting a signaling transmission of the drum rotation in response to differential elongations of the wire extents of 27a and 27b, as when the former experiences a temperature increase because of gas oxidation at its surface. Such means is shown typically to comprise an arm 28 carried by and depending from the drum 26 and normally engaged against stop 29. Differential expansion of the wire extents as related, produces a degree of rotation of the drum which, although it may be slight, is amplified in terms of the terminal swing of the arm 28. Upon swinging to the broken line position 28a in FIG. 2, the arm engages a conductive contact 30 mounted to a terminal screw 31, thus to initiate the signaling of the gas-in-air minimum concentration to be sensed.

In use, the wire 27 will be heated to a temperature in the neigborhood of say 850–900° F. and as a consequence heat will be generated within the housing space 32 at the wire side of the support 15. When exposed to combustible gas, the temperature of the extent 27a may rise to as high as 1500° F. Consequent heating of the air in space 32 tends to create therethrough an upward continuous convection flow of air through the device. It is desirable that there be a more or less balanced relation between the temperatures in the air spaces 32 and 33 at opposite sides of the plate 15, thus to temperature stabilize the physical parts as well as to create up flow of air through both spaces. For this purpose I provide a heating element generally indicated at 34, comprising a resistance coil 35 contained within an open end duct or sleeve 36 and electrically connected to terminal 19 and to an upper binding post or screw 37, see FIG. 5.

FIG. 7 illustrates a useable wiring system for either or both audibly or visually signaling combustible gas at a concentration to be sensed in the atmosphere of the described detector. Through line connections 40 and 41 the system may be energized at a selected voltage, say from 12 to 32 volts, current going to terminal 19 and through the wire 27 normally (when arm 28 and contact 30 are disengaged) to terminal 18, and thence through wires 42 and 43 to a green or safety signal lamp 44. The current then flows through the normally closed relay 45 and line 46 through 47 and manually closed switch 48 to the ground 41.

Upon engagement of arm 28 with the contact 30, the wire 27 current passes through the conductive drum 26 and arm to terminal 31, thence through wire 50 and coil 51 of the relay 52 and through closed switch 53 to illuminate the red or danger signal lamp 54 by current through wire 55. Current passage through the lamp to line 56 energizes the relay coil 57 to open switch 48 and de-energize the safety lamp 44. Simultaneously, current flow through line 58 and switch 59, which may be manually closed, energizes and sounds a buzzer 60 or other audible signaling means.

The described signaling system is responsive to the output from one or any number of differentially located sensors. Thus when a second sensor is to be used, the corresponding wiring connections designated respectively "red," "white" and "black" are made as indicated by the broken lines and their connections in FIG. 6.

I claim:

1. Gas sensing device comprising support means having a pair of electrical terminals, a rotatable electrically conductive drum spaced from said terminals, means mounting said drum for both bodily and rotative movement, a wire connected to said terminals and engaged with the drum to effect its rotation, the wire extents between the drum and said terminals being adapted to be electrically heated by power supplied to the terminals and said extents when heated being differentially reponsible in elongation to small concentrations of combustible gas in the atmosphere of the device to thereby cause rotation of said drum, signal transmission means responsive to rotation of the drum, and yielding means acting to urge the drum away from said terminals to tension said wire extents.

2. A device according to claim 1, in which said wire extents are substantially parallel.

3. A device according to claim 1, in which said signal transmission means comprises an electrically conductive swingable arm carried by the drum, and normally disengaged electrical contacts engageable in response to predetermined movement of the arm.

4. A device according to claim 1, in which one of said wire extents is coated with particulate metallic catalyst sensitive to said gas and the wire extends continuously about the drum.

5. A device according to claim 1, in which said support means comprises a non-conductive plate to one side of which said terminals and drum are mounted.

6. A device according to claim 5, including guide means carried by the plate, a slide connected to the drum and shiftable in said guide means, and as said yielding means a spring acting to shift the guide means and drum to tension said wire extants.

7. Gas sensing device comprising a tubular housing open to permit air flow therethrough, a non-conductive mounting plate within and extending longitudinally of the housing, electrically heated gas sensing means mounted to one side of said plate and operable to signal small concentrations of combustible gas in air passing through the housing, and electrical heating means within the housing at the opposite side only of said plate and operating toward equalizing the internal housing temperatures at both sides of said mounting plate, said sensing means comprising a pair of electrical terminals carried by said plate at one side thereof, a rotatable electrically conductive drum spaced from said terminals and carried by the plate at said side thereof, a wire connected to said terminals and extending continuously about said drum, the wire extents between the drum and said terminals being adapted to be electrically heated by power supplied to the terminals and said extents when heated being differentially responsive in elongation to small concentrations of combustible gas in the atmosphere of the device to thereby cause rotation of said drum, and signal transmission means responsive to rotation of the drum.

8. A device according to claim 7, including also means mounting said drum for bodily movement, and yielding means urging bodily movement of the drum to tension said wire extents.

References Cited

UNITED STATES PATENTS

| | | | |
|---|---|---|---|
| 688,404 | 12/1901 | Freymann et al. | 200—61.03 |
| 1,467,911 | 9/1923 | Arendt et al. | |
| 2,645,564 | 7/1953 | Tiffany | 23—255 |
| 2,652,315 | 9/1953 | McEvoy | 23—255 |
| 2,745,721 | 5/1956 | Tiffany | 23—255 |
| 3,087,795 | 4/1963 | Ross | 23—255 |

JOSEPH SCOVRONECK, Primary Eaminer

U.S. Cl. X.R.

200—61.03; 340—237